(12) United States Patent
Jacob

(10) Patent No.: US 6,257,680 B1
(45) Date of Patent: Jul. 10, 2001

(54) BRAKING SYSTEM FOR RAILROAD CAR/ SEMI-TRACTOR COMBINATION

(76) Inventor: Charles R. Jacob, P.O. Box 611, American Fork, UT (US) 84003

( * ) Notice: Subject to any disclaimer, the term of this patent is extended or adjusted under 35 U.S.C. 154(b) by 0 days.

(21) Appl. No.: 09/261,403

(22) Filed: Mar. 3, 1999

(51) Int. Cl.[7] .................................................... B16T 13/00
(52) U.S. Cl. .............................................................. 303/9.73
(58) Field of Search .................................. 303/6.01, 7, 8, 303/9.61, 9.73, 59, 61, 66, 71, 81, 82; 280/418.1, 415.1, 411; 188/3 R, 3 H, 33, 34, 41, 112 R, 124, 153; 105/72.2, 215.1, 215.2

(56) References Cited

U.S. PATENT DOCUMENTS

| 3,424,502 | 1/1969 | Biabaud . | |
|---|---|---|---|
| 4,007,890 | 2/1997 | Bremer et al. . | |
| 4,938,151 | * 7/1990 | Viens | ...................................... 105/4.3 |
| 4,991,862 | 2/1991 | Tsao et al. . | |
| 5,429,424 | 7/1995 | Huber et al. . | |
| 5,480,042 | 1/1996 | Engle . | |
| 5,826,517 | * 10/1998 | Larson | ................................... 105/4.3 |

* cited by examiner

Primary Examiner—Robert Oberterton
Assistant Examiner—C. T. Bartz
(74) Attorney, Agent, or Firm—Thorpe, North & Western

(57) ABSTRACT

A compressed air braking system for a railcar and railcar moving vehicle combination. The railcar moving vehicle comprises a modified semi-tractor configured to ride on railroad track and couple to a railcar, having a conventional pneumatic braking system for braking itself, and a conventional pneumatic trailer brake system for providing compressed air for actuating the brakes of a semi trailer. In accordance with the invention, the brake line connecting the railcar brake system to the railcar brake cylinder is disconnected, and in its place the trailer brake line is connected directly to the brake cylinder of the railcar, whereby the railcar brakes may be actuated independently or in concert with the tractor brakes by an operator of the modified semi-tractor using either the standard brake pedal or a separate trailer brake lever.

20 Claims, 3 Drawing Sheets

BRAKING SYSTEM FOR RAILROAD CAR/ SEMI-TRACTOR COMBINATION

BACKGROUND OF THE INVENTION

1. Field of the Invention

This invention relates to braking systems for railcars. More particularly, the present invention relates to an improved braking system for a lightweight railcar moving vehicle comprising a modified semi-tractor wherein the braking system of the connected railcar(s) is connected to and actuated by the compressed air braking system of the semi-tractor.

2. State of the Art

In the railroad industry, maintenance of way is a critical activity and a major expense. Frequently, when maintenance is needed at a particular location along the right-of-way and heavy equipment or materials are required, a work train and crew are sent to that location to perform the needed repairs. For example, a work train may carry a load of railroad ties and short sections of rail for repairing track, along with heavy equipment for unloading and installing these items. Often, a work train consists of a locomotive pulling a single work car, and the maintenance work can be performed by one or two workers.

However, this approach can be very cost inefficient. Because maintenance of way crews and locomotive crews are differently trained and unable to perform each other's duties, the work train will frequently employ a crew much larger than actually needed at any given time. Obviously, this is costly. Furthermore, the use of a typical locomotive—which may cost in excess of a million dollars—to transport a single car and a few workers is extremely cost inefficient. For these reasons, it would be desirable to have a railcar moving vehicle that can pull one or a few railcars along the railroad track at mainline speeds, but that is not a conventional locomotive, and thus is not as costly as a locomotive, nor requires a full locomotive crew. With such a vehicle, a work crew could transport themselves to the work site with their materials and equipment, and perform the work with far less expense.

Additionally, it would be desirable to have such a railcar moving vehicle that is operable both on rails and on roadways. Such a vehicle would be valuable for maintenance of way crews by allowing a work crew to transport themselves and their equipment by highway to a rail siding, where the crew simply transfers their materials and equipment to a waiting railcar, and uses the semi-tractor on the rails to pull the railcar to the work site.

This sort of vehicle would have additional uses, as well. For example, many railroad customers have a need to move railcars and highway trailers within a rail yard or industrial siding. However, except for the largest industries, the cost to purchase and maintain a conventional switching locomotive is prohibitive or economically unwarranted. Thus, lightweight, multipurpose railcar moving vehicles have been developed and used to perform many functions normally assigned to switching locomotives, but which may also be used off the track to move trailers and containers about a switching yard or industrial site. Such modified or hybrid vehicles are more economical for many industries because of their relatively low cost and high versatility. They allow smaller industries to take advantage of the efficiency and economy of rail transport for heavy freight where otherwise they would not be able to do so.

However, conventional railcar moving vehicles are still relatively highly specialized, limited production vehicles. The cost per horsepower of these vehicles is significantly higher than the cost of a conventional semi-tractor, for example, which enjoys the cost advantages of much greater mass production. Additionally, conventional railcar moving vehicles are not designed or configured to operate on public highways as long or short haul trucks, but are confined to the industrial site or switching yard. Many of them do not have the functional and safety equipment required to be street legal, and are designed for low speed operation only, being unable to travel at speeds beyond 15 to 20 miles per hour. Moreover, they cannot operate at top speed for extended periods of time without overheating their hydraulic systems. To address these problems, railcar moving vehicles which are constructed from mass produced vehicles such as semi-tractors have been devised to reduce the acquisition cost and versatility of these vehicles.

Normally, the brakes of railroad cars are linked through a common line to the locomotive, which provides pressurized air to operate the braking system of all attached railroad cars. However, when a lightweight railcar moving vehicle such as a modified semi-tractor is coupled to a standard railcar, braking is a major concern. Because a single loaded railcar may weigh many times more than the lightweight railcar moving vehicle, the lightweight vehicle will be able to provide only a small fraction of the braking force needed for stopping in a reasonable distance, especially in an emergency. Obviously, it is desirable to utilize the railroad car brakes in order to take advantage of the weight of the railcar in braking. Conventional railcar moving vehicles known in the art do this by providing a compressed air link to the brake pipe of the connected railcar, thus using the railcar's braking system to stop.

A schematic diagram of a conventional railroad car braking system is given in FIG. 1, which depicts a string of conventional railcars 10 having steel wheels 12 riding on steel rails 14, and coupled together by couplers 16. Each railroad car 10 has installed thereon a brake pipe 18, piston valve 20, reservoir 22, and brake cylinder 24. The brake pipe 18 is in fluid communication with the piston valve 20 through valve 26 which can be opened or closed to allow or prevent compressed air in the brake pipe 18 to pass. Under normal conditions, and as shown in FIG. 1, valve 26 is open. Two conduits 28 and 30 connect the piston valve 20 to the reservoir 22, and one similar conduit 32 connects the piston valve 20 to the brake cylinder 24. The brake cylinder 24 comprises an actuating rod 34 which extends from the cylinder and is axially reciprocally moveable depending on the pressure in the brake cylinder 24. This actuating rod 34 is connected via a mechanical linkage 35 (not shown in its entirety) to the individual brake actuators 36 on each wheel 12 of the railcar in a manner well known in the art.

The brake pipe 18 is connected to the brake pipes 18 of both preceding and following railcars 10, by flexible hoses 38. It will be appreciated that any railcar 10 may be connected to a locomotive and the brake pipe of the locomotive, rather than another railcar, in the same manner.

The typical railcar braking system thus shown operates in the following manner. The locomotive provides compressed air to the brake pipe 18 which communicates along the entire length of the train. Railcar braking systems typically maintain a running pressure of 90 psi in the brake pipe and associated components. With valve 26 open, this operating pressure is maintained within piston valve 20, conduit 28, and reservoir 22. In a non-braking condition, the pressure in conduit 32 is less than that in the brake pipe and other components mentioned, and is approximately equal to atmospheric pressure.

To actuate the brakes of the railcar, the locomotive engineer moves a brake actuating lever (not shown) which opens a valve to allow pressure to escape from the bake pipe 18. Because the brake pipes of all connected railcars are in fluid communication, this action simultaneously releases the pressure in the brake pipes of all connected railcars. When pressure is released from the brake pipe 18, the change in pressure actuates the piston valve 20 to close off its connection to the brake pipe, and simultaneously release compressed air from the cylinder 22, through conduit 30, thence into conduit 32 and the brake cylinder 24. This actuation thus prevents compressed air from reservoir 22 from escaping through the brake pipe, but sends it instead to the brake cylinder 24. Pressurization of brake cylinder 24 in turn causes actuating rod 34 to extend, thus mechanically actuating the brakes 36 of the railcar.

To release the brakes, the system must regain its operating pressure. This requires that the engineer move the brake lever back to the position which will close the release valve, so that the compressor on the locomotive may repressurize the system. Repressurization requires that pressure be built up in all components of all railcars—the brake pipe 18, piston valve 20, and reservoir 22. As pressure in the brake pipe increases, the piston valve 20 changes position such that reservoir 22 is repressurized, and the pressure in the brake cylinder 24 is simultaneously released.

The design of this braking system provides a "failsafe" design because while the brake cylinders operate by means of pressurized air, the system which powers these cylinders is actuated by the release of pressure, not the maintenance of pressure. Thus, a leak anywhere in the system (except in an individual brake cylinder) will automatically cause the brakes to be applied on the entire train. For example, if two connected railcars become uncoupled, the connecting hoses 38 will pull apart, causing the pressure in the brake pipe 18 to be released. This rapid pressure drop will cause the full pressure of the reservoir 22 of each railcar to immediately actuate the brakes on each railcar. It will be apparent that the actuating pressure of the brake cylinder 24 will be something less than the operating pressure maintained in the cylinder 22 because of the need to pressurize a larger volume (both the reservoir 22 and the brake cylinder 24) using the compressed air in the reservoir 22.

However, conventional railroad car braking systems suffer from several problems in their normal operating mode, which adversely affect operation when connected to a lightweight railcar moving vehicle, especially for maintenance work. First, due to the "failsafe" design, it is rather slow to react. Brake actuation is a two step process, requiring the release of pressure from the brake pipe common to all connected railcars before the brake cylinders begin to actuate. This can involve a substantial volume of air, which takes time to release through the single release valve in the locomotive. Additionally, because of this slow reaction time, a train that has just braked to a stop cannot quickly release its brakes and resume movement again. Obviously, this slow braking system reaction time will slow down the work of a maintenance crew.

Moreover, frequent stopping and starting is problematic with conventional railcar braking systems. Each time the brakes are applied, some portion of the compressed air in the system is released. If the brakes are applied several times in close succession, enough of the pressure in the brake reservoirs can be bled away that the brakes become inoperable until the system regains its operating pressure. This can take a substantial amount of time, potentially leaving a moving train without brakes, and possibly creating a "runaway" train. This is a particular nuisance when using a lightweight railcar moving vehicle for maintenance of way operations where very brief stops are required at locations very close together, such as to throw rail switches, or to set out or pick up railroad ties or other track material.

Semi-tractors normally include compressed air systems for powering the brakes of a standard highway trailer. However, these are actuated by means of providing high pressure air, not by releasing it. Accordingly, it is apparent that the respective braking systems of the train and semi-tractor operate in directly opposite manners. Nevertheless, it would be desirable to have a braking system for a lightweight railcar moving vehicle constructed from a conventional semi-tractor, wherein the compressed air system for providing braking power to a highway trailer is adapted to power the braking system of a railroad car, and the braking system for the railcar may be actuated by the same means that actuates the highway trailer brakes on conventional semi-tractor trailer combinations. It would also be desirable for a lightweight railcar moving vehicle to have a braking system that uses the brakes of the railcar, but does not rely on the slow reaction time of the railcar braking system.

OBJECTS AND SUMMARY OF THE INVENTION

It is therefore an object of the present invention to provide a braking system for a railcar moving vehicle that has been constructed from a semi-tractor, wherein the braking system of the connected railcar is connected to and actuated by the compressed air system of the semi-tractor.

It is another object of this invention to provide a braking system for a railcar moving vehicle wherein the braking system of the connected railcar is actuated by the same means which actuates the trailer brake for a conventional highway trailer.

It is another object of this invention to provide a braking system for a railcar moving vehicle that uses the brakes of the railcar, but does not rely on the slow reaction time of the railcar braking system.

The above and other objects are realized in a preferred embodiment of a compressed air braking system for a railcar and railcar moving vehicle combination. The railcar moving vehicle comprises a modified semi-tractor configured to ride on railroad track and couple to a railcar, having a conventional pneumatic braking system for braking itself, and a conventional pneumatic trailer brake system for providing compressed air for actuating the brakes of a semi trailer. In accordance with the invention, the brake line connecting the railcar brake system to the railcar brake cylinder is disconnected, and in its place the trailer brake line is connected directly to the brake cylinder of the railcar, whereby the railcar brakes may be actuated independently or in concert with the tractor brakes by an operator of the modified semi-tractor using either the standard brake pedal or a separate trailer brake lever.

In an alternative embodiment, the modified semi-tractor is provided with a secondary brake system for use in concert with the above mentioned brake system when two or more railcars are coupled to said modified semi-tractor. The previously mentioned brake system is connected to the first railcar, while the secondary brake system provides compressed air to the brake pipes of the second and subsequent attached railcars through the brake pipe of the first railcar. A valve is closed in the system of the first railcar so that the brake pipe of the first railcar is isolated from the modified braking system thereof. A railcar brake controller is provided to allow selective release of air pressure in the brake pipe to actuate the brakes of the second and subsequent railcars in the manner of conventional railcars.

The above and other objects and features of the present invention will be apparent to those skilled in the art, based on the following description, taken in combination with the accompanying drawings.

BRIEF DESCRIPTION OF THE DRAWINGS

Referring now to the drawings.

DETAILED DESCRIPTION OF THE PREFERRED EMBODIMENT

Figure 1:
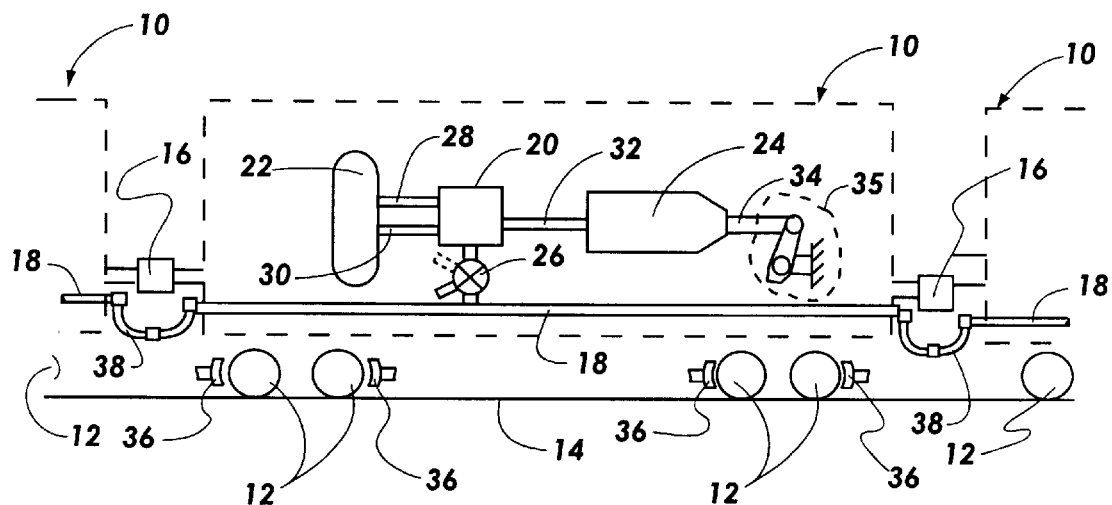
FIG. 1 is a schematic diagram of a conventional railcar braking system.
Figure 2:
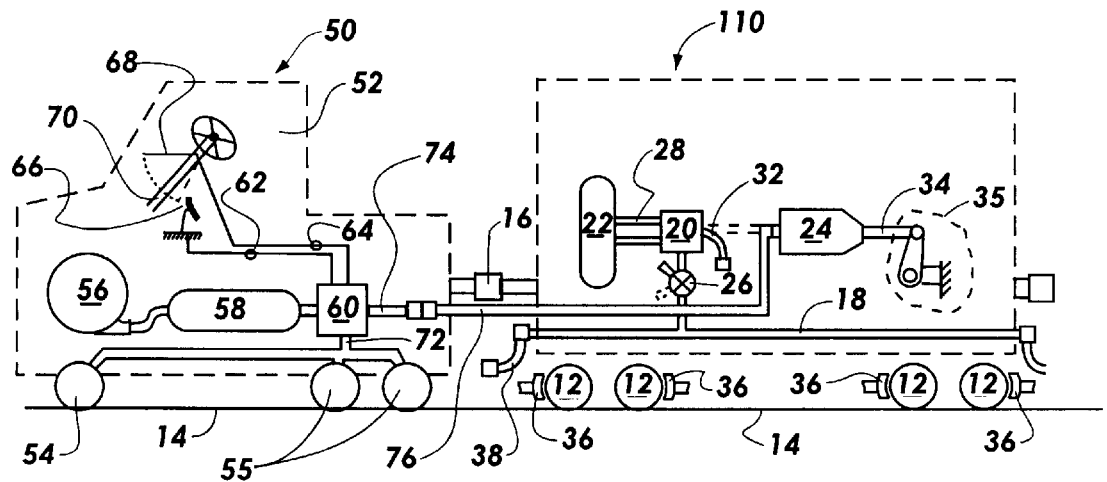
FIG. 2 is a schematic diagram of the railcar braking system of the present invention for use with a modified semi-tractor railcar moving vehicle.

Referring now to the drawings:

FIG. 2 provides a schematic diagram of a pneumatic railcar braking system according to the present invention. This braking system is configured for use with a modified semi-tractor railcar moving vehicle 50 coupled via coupler 16 to a modified railcar 110. The modified railcar 100 has a braking system substantially similar to that of the standard railcar 10 shown in FIG. 1, which comprises a brake pipe 18, piston valve 20, reservoir 22, and brake cylinder 24. It will be apparent that additional railcars may be coupled to the opposite end of railcar 110 if desired, in the conventional manner. The railcar moving vehicle 50 is a modified semi-tractor having a cab 52, and steel wheels 54 and 55 which are configured for riding on the rails 14. The modified semi-tractor has a conventional pneumatic braking system comprising a compressor 56, master reservoir 58, and controller 60. Typical master reservoirs have a capacity of approximately 100 gallons (~13.4 ft$^3$), and typical semi-tractor compression systems are capable of attaining a peak pressure of approximately 120 psi.

The controller 60 receives compressed air from the master reservoir 58, and receives control input via electrical, mechanical, or hydraulic linkages 62 and 64 from the semi-tractor brake pedal 66 and trailer brake lever 68. In many semi-tractors the trailer brake lever 68 is conveniently mounted on the steering column 70 as shown in FIG. 2. The controller 60 has a first pneumatic output 72 which communicates with the pneumatic braking actuator (not shown) of each wheel 54 of the semi-tractor for normal braking thereof. The controller 60 also has a second pneumatic output 74 which provides compressed air for actuation of a trailer brake.

The brake compressor 56, master reservoir 58, controller 60, first pneumatic output 72, and brake actuators associated with wheels 54 and 55 collectively comprise the tractor braking system. The compressor 56, master reservoir 58, controller 60, and second pneumatic output 74 collectively comprise the trailer brake system.

When operating the semi-tractor in its conventional manner to pull a highway trailer, the second output 74 is connected to the highway trailer to power the brakes thereof. However, in an advantageous feature of the present invention, when the railcar moving vehicle is configured for pulling a railcar as in FIG. 2, conduit 32 which normally supplies compressed air from the railcar reservoir 22 to the railcar brake cylinder 24 is disconnected, and the second output 74 is connected directly to the railcar brake cylinder 24 by hose 76 for directly providing compressed air from the railcar moving vehicle 50 to the railcar brake cylinder. In this configuration, valve 26 is closed, such that the braking system of car 110 does not communicate with the brake pipe 18. It will be apparent that the connecting hose 38 of the brake pipe 18 is not connected to any compressed air source.

It will be apparent to those skilled in the art that various additional components of conventional railroad braking systems such as pressure gages, pressure release valves, check valves, and so forth, will be employed in the system thus described to create a complete and workable system. Naturally, these additional components may be incorporated in a variety of configurations which will serve the purposes of the present invention. The present disclosure is intended to indicate the essential elements of the invention, without repeating all additional elements which could be included, and are well known in the art.

This system advantageously allows the driver of the railcar moving vehicle to directly apply the brakes of the railcar by depressing the brake pedal 66 of the semi-tractor. Alternatively, the driver may apply the brakes of the railcar alone by using the trailer brake lever 68. Because the railcar may weigh much more than the railcar moving vehicle, sufficient braking force may be generated in this manner alone. Using either method, however, the railcar brakes may be actuated in the same manner that truck brakes are actuated, such that an individual with truck driving skills needs no additional training to operate the brakes of the railcar moving vehicle. Additionally, because the semi-tractor's braking system is directly connected to the railcar brake cylinder 24, the reaction of the brakes is much faster, and the brakes may also be released much faster.

Figure 3:
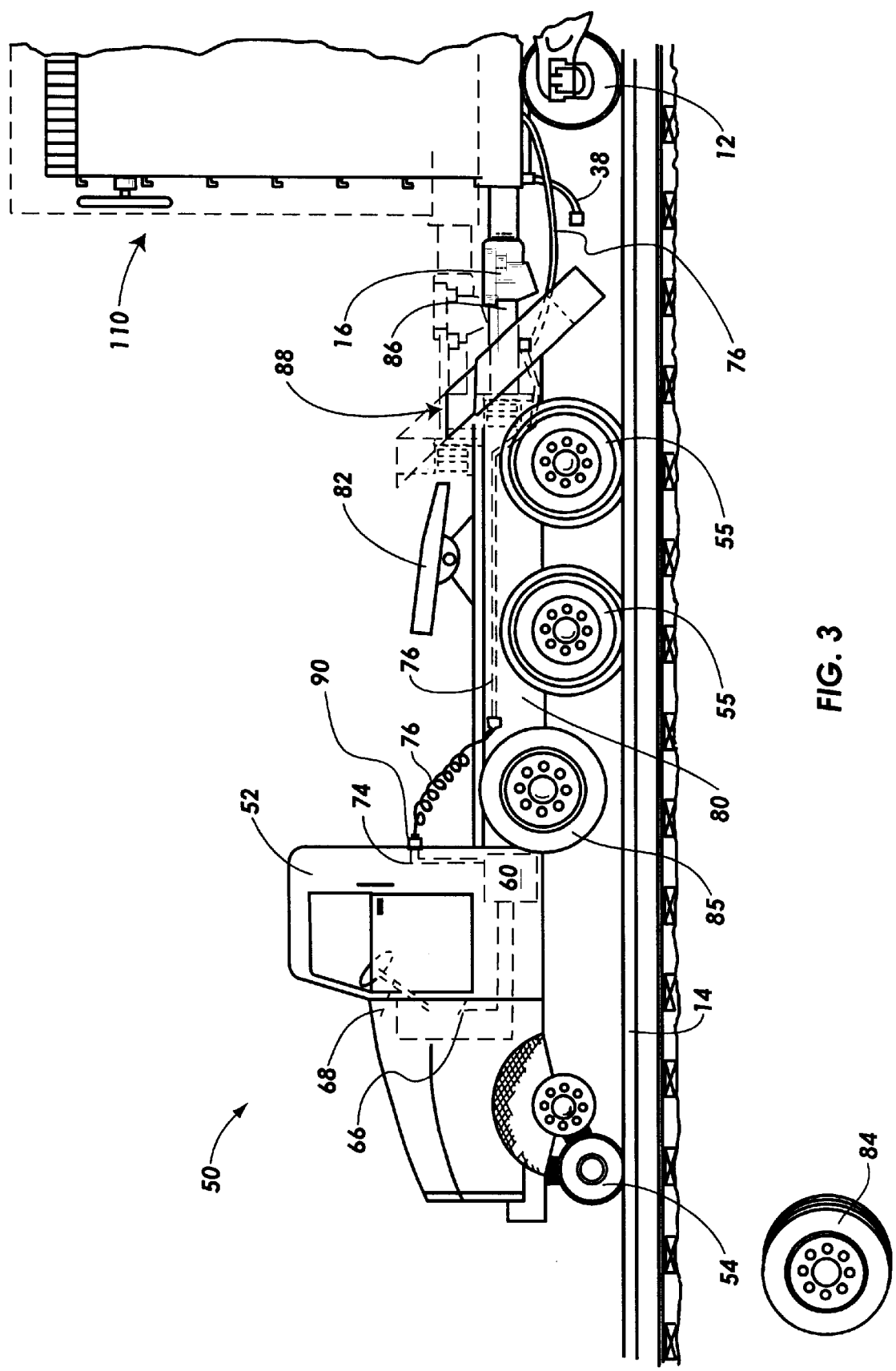
FIG. 3 is a side view of a semi-tractor configured for use as a railcar moving vehicle and coupled to a railcar and provided with a railcar braking system in accordance with the present invention.

FIG. 3 provides a side pictorial view of the railcar moving vehicle of the present invention. The railcar moving vehicle 50 comprises a modified semi-tractor having an elongate frame 80, a cab 52 housing the truck engine and controls, and standard fifth-wheel assembly 82 for pivotally connecting the tractor to a conventional highway trailer (not shown). However, to function as a railcar moving vehicle, the semi-tractor is provided with drive wheels 55 located toward the rear of the frame 80, and typically smaller guide wheels 54 to support the front of the vehicle. It will be apparent that the drive wheels 55 must be affixed to the drive axles of the tractor so as to propel the vehicle. As shown in FIG. 3, the vehicle 50 is also provided with unpowered rubber tired auxiliary wheels 85 which are common on large trucks, and which may be selectively raised and lowered by hydraulic or pneumatic means for contact with a roadway so as to spread the weight when the truck is carrying a particularly heavy load. It will be apparent that when configured for use as a railcar moving vehicle, the rubber-tired wheels 84 used for highway operation are removed.

Attached to the rearward portion of the frame 80, immediately behind the fifth wheel assembly 82, is a coupler 16 and drawbar 86 for coupling to a typical railcar, such as a boxcar 110 as depicted in FIG. 3. The coupler 16 and drawbar 86 are typically connected to the frame 80 by means of a hydraulic lifting mechanism, indicated generally at 88, which allows an upward force to be applied by the railcar moving vehicle 50 to the front of the railcar 110, so as to transfer a portion of the weight of the railcar 110 to the railcar moving vehicle 50 in order to give the railcar moving vehicle sufficient traction.

The components of the air compression brake system as shown in FIG. 2 are not entirely shown in FIG. 3. However, the controller 60, the brake pedal 66, and trailer brake lever 68 are schematically shown in this view. On conventional semi-tractors, the second outlet 74 typically terminates in a coupler 90 located on the back of the cab 52. This coupler is designed for the connection of a trailer brake line. In the present invention, hose 76 is connected to coupler 90, and extends backward along the vehicle frame 80 to the railcar 110. There, the hose 76 is connected directly to the brake cylinder 24 of the railcar (not shown in FIG. 3). As shown in FIG. 3, the hose 76 is preferably disposed along the inboard side of the frame 80, but may be connected in any suitable manner. It will be apparent that hose 76 must have adequate flexibility to accommodate the motion and variable positions of the hydraulic lift mechanism 88.

Figure 4:
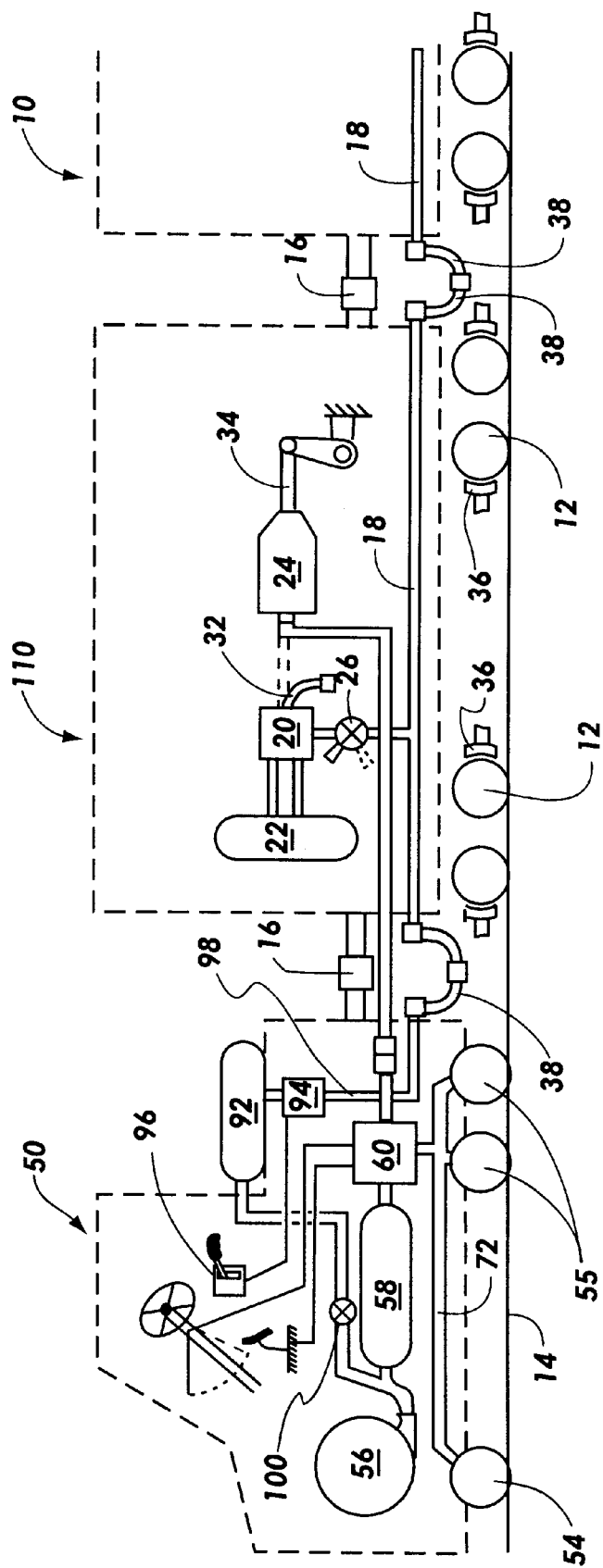
FIG. 4 is a schematic diagram of an alternative embodiment of the railcar braking system of the present invention configured for use with two or more railcars coupled to the railcar moving vehicle.

FIG. 4 is a schematic diagram of an alternative embodiment of the railcar braking system of the present invention. This embodiment is configured for use when two or more railcars are coupled to the railcar moving vehicle. In this embodiment, the railcar moving vehicle is provided with a secondary compressed air system for powering conventional railcar brakes. The system may be powered by the same compressor 56 as the truck brake system, assuming this system has adequate power and capacity. Alternatively, a secondary compressor may be provided for supplying pressurized air to the secondary railcar braking system. If one compressor is used, it is connected both to the main reservoir 58, and a secondary reservoir 92, preferably separated by a check valve 100 or other pressure regulating mechanism to allow different pressures to reside within main reservoir 58 and the secondary reservoir 92.

The secondary reservoir is connected to a secondary controller 94, which receives input from a railroad brake switch 96, located in the cab 52 of the vehicle. The brake switch 96 may comprise a multi-position electrical switch, or may comprise a multiple valve assembly for selectively releasing pressure from the secondary reservoir 92. In embodiment of FIG. 4, the first railcar is the modified railcar 110 having its brake cylinder 24 directly connected to the truck braking system. However, the second railcar 10 (and subsequent railcars, if any) have a conventional railcar brake system as in FIG. 1, which is powered by the secondary brake system. The secondary controller 94 provides compressed air to line 98, which leads to a connecting hose 38, which in turn connects to the brake pipe 18 of the first railcar 10. However, with the valve 26 of the first railcar in the closed position, the pressure in the brake pipe has no effect on the first car 10. However, the brake pipe 18 of the first car communicates with the brake pipe 18 of the subsequent cars, so as to power the pressurized brake system of those cars as described with regard to FIG. 1.

The brake switch 96 will preferably have Run, Brake, and Emergency modes for controlling the railcar brake system for these subsequent cars, similar to the configuration of braking systems in conventional locomotives. In the Run mode, full pressure is maintained in the brake pipe 18, which keeps the brakes of railcars 10 disengaged. When the operator moves the brake switch to the Brake mode, pressure is gradually released from the brake pipe 18, to cause the brakes of the second and subsequent cars to engage any desired amount. In the Emergency mode, all pressure is rapidly released from the secondary brake system, causing immediate maximum braking of all connected cars.

The railcar moving vehicle described herein is very economical because it may be used both on and off of the rails. Also, because it is a modified semi-tractor, rather than a limited production specialty vehicle, the economics of mass production help to keep its cost relatively low. The greatest advantage, however, is the avoidance of the need to provide an additional compressor system to power the brakes of a railcar, and the use of the conventional truck braking control mechanisms located in the cab of the semi-tractor. These controls allow an operator familiar with large trucks to safely and easily apply the brakes of a railcar to provide more effective braking with a lightweight railcar moving vehicle. In addition, the hybrid embodiment utilizing a secondary pneumatic system allows the railcar brakes of a second and subsequent coupled railcars to be operated by the operator of the railcar moving vehicle.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A compressed air braking system for a railcar and railcar moving vehicle comprising:

a railcar moving vehicle comprising a modified semi-tractor configured to ride on railroad track and couple to a railcar, said modified semi-tractor having a cab and comprising:

a tractor braking system for braking said modified semi tractor;

a trailer brake system comprising means for producing compressed air and maintaining a volume of said compressed air at a pressure suitable for actuating the brakes of a highway trailer;

a trailer brake actuation device for actuating said trailer brake system; at least one railcar coupled to said modified semi tractor and having a compressed air actuated brake system comprising a brake cylinder for actuating the brakes thereof; and a coupling line for transmitting the compressed air from said trailer brake system directly to the brake cylinder of said railcar, whereby an operator of said modified semi-tractor may actuate the brakes of said railcar by manipulating the trailer brake actuation device.

2. The braking system as described in claim 1 wherein the coupling line for transmitting the compressed air from said trailer brake system to the brake cylinder of said railcar comprises a compressed air conduit connecting said trailer brake system directly to the inlet of said brake cylinder.

3. The braking system as described in claim 1, further comprising a dual actuating device for simultaneously actuating said trailer brake system and said tractor braking system.

4. The braking system as described in claim 3 wherein said trailer brake actuation device comprises a trailer brake lever disposed in the cab of said modified semi-tractor; and said dual actuating device comprises a brake pedal located in the cab of said modified semi-tractor.

5. The braking system as described in claim 3 wherein the coupling line for transmitting the compressed air from said trailer brake system to the brake cylinder of said railcar comprises a compressed air conduit connecting said trailer brake system to the inlet of said brake cylinder.

6. The braking system as described in claim 5 wherein said trailer brake system further comprises:
an air compressor powered by said modified semi-tractor;
a master reservoir in fluid communication with said air compressor for receiving and storing compressed air therefrom;
a brake controller having an inlet in fluid communication with said master reservoir, at least one outlet for connection to said compressed air conduit, and being connected to said trailer brake actuation device and said dual actuating device for receiving signals therefrom for controlling the flow of compressed air into said compressed air conduit.

7. The braking system as described in claim 6 wherein said brake controller further comprises a second outlet in fluid communication with the tractor braking system for controlling the flow of compressed air to said tractor braking system in response to signals from said dual actuating device.

8. The braking system of claim 1 wherein said brake cylinder further comprises a substantially linearly moveable actuating rod, and the compressed air actuated brake system of said at least one railcar further comprises:
a brake pipe extending from one end of said railcar to the other end thereof, said brake pipe having a tee disposed therein for allowing fluid communication between said brake pipe and said braking system;
a piston valve in fluid communication with said tee for controlling the flow of compressed air from said brake pipe to said brake system;
a cutoff valve disposed in said tee whereby said piston valve may be isolated from said brake pipe;
a reservoir in fluid communication with said piston valve for receiving and containing compressed air therefrom;
a brake cylinder conduit connecting said piston valve to said brake cylinder for transmitting compressed air from said piston valve to said brake cylinder; and
a mechanical linkage for connecting the actuating rod of the brake cylinder to the brakes of each wheel of the railcar to provide braking power thereto.

9. A railroad car semi-tractor combination, comprising:
a railcar having a brake cylinder for actuating the brakes thereof;
a modified semi-tractor configured to ride on railroad track and couple to the railcar, said modified semi-tractor having:
a tractor braking system for braking said modified semi-tractor;
a trailer brake system comprising means for producing compressed air and maintaining a volume of said compressed air at a pressure suitable for actuating the brakes of a highway trailer;
a trailer brake actuation device for actuating said trailer brake system; and
a coupling device for direct attachment of said trailer brake system to the brake cylinder of a railcar so as to transmit compressed air from said trailer brake system directly to the brake cylinder of said railcar, whereby an operator of said modified semi-tractor may actuate the brakes of said railcar by manipulating the trailer brake actuation device.

10. The modified semi-tractor as described in claim 9, further comprising a dual actuating device for simultaneously actuating said trailer brake system and said tractor braking system.

11. A compressed air braking system for at least one railcar and a railcar moving vehicle, comprising:
a railcar moving vehicle comprising a modified semi-tractor configured to ride on railroad track and couple to a railcar, said modified semi-tractor comprising:
tractor braking means for braking said modified semi-tractor;
trailer brake means comprising means for producing compressed air and maintaining a volume of said compressed air at a pressure suitable for actuating the brakes of a highway trailer;
trailer brake actuating means for actuating said trailer brake means;
railcar brake means comprising means for producing compressed air and maintaining a volume of said compressed air at a pressure suitable for actuating the brakes of one or more conventional railcars;
railcar brake actuating means for actuating said railcar brake means;
a first railcar coupled to said modified semi-tractor, said first railcar comprising:
a compressed air actuated brake system comprising a brake cylinder for actuating the brakes of said first railcar;
a brake pipe configured for transmitting compressed air from said railcar brake means to said compress air actuated brake system; and
means for transmitting compressed air from said trailer brake means to said brake cylinder of said first railcar, whereby an operator of said modified semi-tractor may actuate the brakes of said first railcar by manipulating said trailer brake actuating means.

12. The braking system as described in claim 11, further comprising
a second railcar coupled to said first railcar, said second railcar comprising:
a compressed air actuated brake system; and
a brake pipe configured for transmitting compressed air from the brake pipe of said first railcar to the compressed air actuated brake system of said second railcar whereby an operator may actuate the brakes of said second railcar by manipulating said railcar brake actuating means.

13. The braking system as described in claim 12, further comprising:
a string of one or more additional railcars coupled to said second railcar, each of said additional railcars comprising:
compressed air actuated railcar braking means; and
a brake pipe configured for transmitting compressed air from the brake pipe of the preceding railcar of the string to the following railcar of the string, and for transmitting compressed air to the compressed air actuated railcar braking means thereof, whereby an operator of said modified semi-tractor may simultaneously actuate the brakes of said second railcar and said string of one or more additional railcars by manipulating said railcar brake actuating means.

14. The braking system as described in claim 13 wherein said railcar brake means further comprises:
means for producing compressed air and maintaining a volume of said compressed air at a pressure suitable for actuating the brakes of one or more railcars; and
means for selectively releasing pressure from the brake pipes of said second railcar and said string of one or more additional railcars so as to actuate the brakes thereof.

15. The braking system as described in claim 14 wherein said railcar brake means further comprises:
- an air compressor powered by said modified semi-tractor;
- a secondary reservoir in fluid communication with said air compressor for receiving and storing compressed air therefrom; and
- a railcar brake controller having an inlet in fluid communication with said secondary reservoir, and an outlet for connection to the brake pipe of said first railcar, said railcar brake controller being connected to said railcar brake actuating means for receiving signals therefrom for controlling the flow of compressed air into said brake pipe.

16. The braking system as described in claim 15 wherein said railcar brake actuating means comprises:
- a plurality of solenoid actuated ball valves in fluid communication with said brake pipe; and
- a three-position electrical switch for controlling said solenoid actuated ball valves so as to allow an operator to selectively release pressure from said railcar braking system, said three-position switch having: (i) a Run mode in which no pressure is released from said railcar braking system; (ii) a Brake mode in which pressure is gradually released from said railcar braking system; and (iii) an Emergency mode in which all pressure is rapidly released from said railcar braking system.

17. A method of actuating the brakes of at least one railcar coupled to a railcar moving vehicle comprising the steps of:
- (a) obtaining a railcar moving vehicle comprising a modified semi-tractor configured to ride on railroad track and mechanically couple to and pull a railcar, said modified semi-tractor comprising:
  - a tractor braking system for braking said modified semi-tractor;
  - a trailer brake system comprising means for producing compressed air and maintaining a volume of said compressed air at a pressure suitable for actuating the brakes of a highway trailer; and
  - a trailer brake actuating device for actuating said trailer brake system;
  - a dual actuating device for simultaneously actuating said trailer brake system and said tractor braking system;
- (b) obtaining a first railcar having a compressed air actuated brake system comprising a brake pipe, a brake cylinder for actuating the railcar brakes, said brake cylinder having an inlet, and a cutoff valve for isolating said brake cylinder from said brake pipe;
- (c) coupling said first railcar to said modified semi-tractor;
- (d) closing said cutoff valve to isolate said brake cylinder from said brake pipe;
- (e) disconnecting the railcar braking system compressed air supply line connecting said piston valve to the inlet of the brake cylinder of said first railcar;
- (f) connecting said trailer brake system directly to the inlet of said brake cylinder such that compressed air from said trailer brake system may flow directly into said brake cylinder; and
- (g) applying the brakes of said first railcar by manipulating said trailer brake actuating device so as cause compressed air to flow from said trailer brake system into said brake cylinder.

18. The method as described in claim 17 wherein the step of applying the brakes of said railcar comprises the step of:
- (h) manipulating said dual actuating device so as to simultaneously actuate said trailer brake system and said tractor braking system.

19. The method as described in claim 17, further comprising the steps of:
- (h) obtaining a railcar moving vehicle further comprising:
  - a railcar brake system comprising means for producing compressed air and maintaining a volume of said compressed air at a pressure suitable for actuating the brakes of one or more conventional railcars;
  - a railcar brake actuating device for actuating said railcar brake system;
- (i) coupling a second railcar to said first railcar, said second railcar comprising a brake pipe, and a compressed air actuated brake system;
- (j) coupling the brake pipe of said first railcar to said railcar brake system;
- (k) coupling the brake pipe of said second railcar to the brake pipe of said first railcar so as to transmit compressed air from the railcar brake system to the compressed air actuated brake system of said second railcar; and
- (l) actuating the brakes of said second railcar by manipulating said railcar brake actuating device.

20. The method as described in claim 19, further comprising the steps of;
- (m) coupling a string of at least one additional railcar to said second railcar, each of said additional railcars comprising a brake pipe, and a compressed air actuated brake system; and
- (n) coupling the brake pipe of said string of at least one additional railcar to the brake pipe of said second railcar so as to transmit compressed air from the railcar brake system to the compressed air actuated brake system of said string of one or more additional railcars;
- (o) actuating the brakes of said string of one or more additional railcars by manipulating said railcar brake actuating device.

* * * * *